US009576223B2

(12) United States Patent
Aupetit et al.

(10) Patent No.: US 9,576,223 B2
(45) Date of Patent: Feb. 21, 2017

(54) METHOD AND SYSTEM FOR EVALUATING THE RESEMBLANCE OF A QUERY OBJECT TO REFERENCE OBJECTS

(75) Inventors: Michaël Aupetit, Puteaux (FR); Sylvain Lespinats, Paris (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 1210 days.

(21) Appl. No.: 13/503,621

(22) PCT Filed: Oct. 22, 2010

(86) PCT No.: PCT/EP2010/065997
§ 371 (c)(1),
(2), (4) Date: Nov. 21, 2012

(87) PCT Pub. No.: WO2011/048219
PCT Pub. Date: Apr. 28, 2011

(65) Prior Publication Data
US 2013/0066592 A1    Mar. 14, 2013

(30) Foreign Application Priority Data
Oct. 23, 2009   (FR) ...................................... 09 05117

(51) Int. Cl.
*G06F 17/18*    (2006.01)
*G06K 9/62*    (2006.01)
(Continued)

(52) U.S. Cl.
CPC ............ *G06K 9/6251* (2013.01); *G06F 17/16* (2013.01); *G06F 17/301* (2013.01); *G06F 17/30011* (2013.01)

(58) Field of Classification Search
CPC ................. G06K 9/6251; G06K 9/626; Y10S 707/99933; Y10S 707/99936; G06F 17/3025; G06F 17/30259; G06F 17/30262; G06F 17/16; G06F 17/30011; G06F 17/301; G06Q 50/22

See application file for complete search history.

(56) References Cited

U.S. PATENT DOCUMENTS 6,446,060 B1 * 9/2002 Bergman ............ G06F 17/3025
707/770
7,272,593 B1 * 9/2007 Castelli ............ G06F 17/30648
707/600
(Continued)

OTHER PUBLICATIONS

Sergios Theodoridis, et al., "Pattern Recognition", Feb. 11, 2009, pp. 60-65 and 323-329, Academic Press, Burlington, MA, US XP002593683.
(Continued)

*Primary Examiner* — John Breene
*Assistant Examiner* — Mohammad Islam
(74) *Attorney, Agent, or Firm* — Baker Hostetler LLP

(57) ABSTRACT

A method and a system for evaluating the class of a test datum in a data space of dimension D where D≥3, each datum belonging to at least one class grouping together several data, comprising: projecting a suite of reference data of the data space into a space of dimension Q where Q<D, the class of each reference datum being known, calculating a measurement of similarity of the test datum to each of the reference data, partitioning the projection space into a plurality of disjoint regions each containing the projection of one and only one reference datum, and finally evaluating the class of the test datum, this class being evaluated as being the same class as one of the reference data contained in one of the regions containing the reference data closest to the test datum in the sense of the similarity measurement.

26 Claims, 6 Drawing Sheets

(51) Int. Cl.
*G06F 17/16* (2006.01)
*G06F 17/30* (2006.01)

(56) References Cited

U.S. PATENT DOCUMENTS

| | | | | |
|---|---|---|---|---|
| 2001/0019628 | A1* | 9/2001 | Fujimoto | G06K 9/6857 382/225 |
| 2007/0073748 | A1* | 3/2007 | Barney | G06F 17/30675 |
| 2009/0006156 | A1* | 1/2009 | Hunt | G06Q 30/02 705/7.11 |
| 2009/0006382 | A1* | 1/2009 | Tunkelang | G06F 17/30424 |
| 2011/0191343 | A1* | 8/2011 | Heaton | G06F 19/3443 707/737 |
| 2011/0311129 | A1* | 12/2011 | Milanfar | G06K 9/00335 382/154 |
| 2012/0039539 | A1* | 2/2012 | Boiman | G11B 27/28 382/195 |
| 2012/0041905 | A1* | 2/2012 | Huh | G06F 17/16 706/12 |

OTHER PUBLICATIONS

James McNames, "A Fast Nearest Neighbor Algorithm Based on a Principal Axis Search Tree", IEEE Transactions on Pattern Analysis and Machine Intelligence, Sep. 1, 2001, pp. 964-976, vol. 23, No. 9, IEEE Service Center, Los Alamitos, CA, US, XP001133374.

Michael Aupetit, et al., "High-Dimensional Labeled Data Analysis with Topology Representing Graphs", Neurocomputing, Jan. 1, 2005, pp. 139-169, vol. 63, Elsevier Science Publishers, Amsterdam, NL, XP004702824.

Sylvain Lespinats, et al., "DD-HDS: A Method for Visualization and Exploration of High-Dimensional Data", IEEE Transactions on Neural Networks, Sep. 1, 2007, pp. 1265-1279, vol. 18, No. 5, IEEE Service Center, Piscataway, NJ, USA, XP011191397.

Aupetit et al.: "Visualizing distortions and recovering topology in continuous projection techniques," Neurocomputing, Elsevier Science Publishers, Amsterdam, NL, vol. 70, No. 7-9, Mar. 21, 2007, pp. 1304-1330, XP022067245.

* cited by examiner

METHOD AND SYSTEM FOR EVALUATING THE RESEMBLANCE OF A QUERY OBJECT TO REFERENCE OBJECTS

CROSS-REFERENCE TO RELATED APPLICATIONS

This application is a National Stage of International patent application PCT/EP2010/065997, filed on Oct. 22, 2010, which claims priority to foreign French patent application No. FR 0905117, filed on Oct. 23, 2009, the disclosures of which are incorporated by reference in their entirety.

FIELD OF THE INVENTION

The present invention relates to a method and a system for evaluating the resemblance of a query object to reference objects. It applies for example in the field of shape recognition. For example, the object may be a hardware object, an individual, the state of a system, or else a group of such objects, individuals or states, some of the physical characteristics of which are measured.

BACKGROUND

Discriminators make it possible to classify objects, that is to say to take a decision on the an object's membership in a class or in several predefined classes of objects. For example, the physical characteristics of the state of a patient are measured, such as his size, his weight, his age, his pulse and his body temperature. This patient is the query object or query patient. The measured values are thereafter provided to a discriminator, which compares these characteristics with those of other patients identified as suffering from such and such an illness. These other patients are the reference objects or reference patients. The illnesses are the classes. The discriminator assigns to the query patient the same illness as that of the closest reference patients in the sense of a proximity measurement based on the measured characteristics. Such applications are used as a decision aid, they can even make it possible to dispense with the opinion of an expert. But they can also provide the expert with a membership class which reinforces or otherwise his diagnosis of the patient and which may prompt him to a finer analysis in the case of disagreement. However, the intelligibility of the result of the discriminator is crucial in order that the expert can have confidence in the latter and that the aid is useful and effective.

In order to obtain the user's confidence, decision aid systems propose to associate a confidence indicator with the decision taken by the discriminator. The proposed decision is not explained, the system behaving as a black box, but it provides the user with an indicator presumed to reassure him regarding the quality of this decision. This indicator may be of probabilistic nature, or else obtained by relative comparison of the decisions of several different discriminators. In all cases, this indicator is obtained by a process that is relatively complex from the point of view of the non-specialist user of discrimination methods. In a certain manner, the discrimination system in the broad sense which provides both a decision and a confidence indicator for this decision is judge and jury, this not being apt to inspire the confidence of the user.

Other decision aid systems are based on explaining the decision taken by the discriminator in terms that are intelligible to the user. For example, fuzzy inference systems explain their decision as the result of a weighted sum of logical rules directly involving the original characteristics of the objects, these quantities and their combination being assumed to be easy for the user to interpret. However, to obtain a discrimination of good quality, the number of rules and parameters is often considerable, thereby greatly decreasing the intelligibility of the system.

Finally, other decision aid systems provide a probability of membership in various classes. In this case, the decision taken by the discriminator is not unique and the system does not decide on the assigning of a class in particular. The choice of a class for the query object is left to the astuteness of the user, who may be aided by these probabilities. However, the probabilities are assigned to the classes as a whole set, without explaining the process which makes it possible to pass from the reference objects to their membership classes. Thus, although the number of probabilities to be assessed is reduced, since it is equal to the number of classes, the process for calculating these probabilities remains unknown to the user. Therefore the information is overall very unintelligible to him.

In these three cases of discriminator according to the prior art, although the initial aim is to assist the work of the user, he is in reality asked to acquire an additional skill in the field of automatic discrimination. Indeed, the intelligibility of the system to the user depends on his understanding of the often sophisticated methods employed to generate the decision.

In addition to the use of discriminators to solve object classification problems, methods also exist for visualizing objects and classes so as to analyze the structure of classes or else to grade projections. These visualization methods may for example rely on methods for projecting the objects making it possible notably to represent the objects and the classes on a plane map. The position of the objects on this map is such that the objects which resemble one another according to a similarity measurement are rather close on the map. Reciprocally, objects that are not very similar are rather far apart on the map. A query object can then be positioned on this map via the same principle by taking account of its similarity to the already positioned reference objects. In addition to the technical problem of the positioning of this query object with respect to the others there arises the problem of interpreting this position in terms of membership class. Indeed, whether or not they take account of classes, projection methods induce a loss of information called false neighborhood or stitching, which artificially clusters objects which are in fact far apart according to the measurement of their similarity. These false neighborhoods exist either because it is technically impossible to adhere to the whole set of similarities during projection, or because although it is technically possible, the projection method did not know how to find this solution. Thus, the user may assign to a query object the majority class of the surrounding objects on the map, even if these objects are falsely close to the query object.

To attempt to surmount the problems related to false-neighborhoods, diagnostic methods making it possible to visualize these false-neighborhoods have been proposed, such as for example in the article "Visualizing distortions and recovering topology in continuous projection techniques" (Aupetit M., Neurocomputing, vol. 10, no. 7-9 pp. 1304-1330, 2007). Unfortunately, this method does not make it possible to evaluate the class of a query object with the help of reference objects belonging to known classes. Thus, when it is implemented to grade a projection, the method simply manipulates objects which are all "unlabeled", whereas when it is implemented to analyze the structure of classes, the method simply manipulates objects which are all "labeled".

Finally, it is also possible to visualize the reference objects close to the query object in the form of a list of reference objects ordered according to their decreasing proximities to the query object. Such is typically the case in search engines on the Internet network, where a query gives rise to the displaying of a list of reference Internet pages, ordered by proximity to the query. In this case, the list of reference objects that is presented to the user is dependent on the query used on the one hand, and exhibits a linear order on the other hand. In certain search engines on the Internet network, the query gives rise to the displaying of a set of ordered reference Internet pages in the forms of groups on a plane map which are emphasized graphically (color, size, etc.) so as to signify their proximity to the query. In this case again, the map presented to the user depends on the query. In all these cases, the list of reference objects presented, as well as their positions in the spatial (map) or linear (ordered list) representation, depend on the query. The user therefore cannot construct a stable mental representation of the universe of the reference objects, this universe never being presented to him in a manner which is complete or independent of the query. He cannot then by himself judge the quality of the information regarding proximity to the query, which is presented to him. Neither can he easily assess the resemblances or the differences between the query objects conveyed through their representation in terms of reference objects, since he has no fixed basis of comparison.

SUMMARY OF THE INVENTION

The aim of the invention is notably to allow the user to make a stable mental representation of the universe of the reference objects independently of the query object. Accordingly, the invention proposes to cut the map into disjoint zones each associated with a reference object, and to indicate to the user in each zone, the degree of resemblance between the query object and the reference object of this zone. Thus, it is not necessary to position the query object on the map, nor to define a zone of the map corresponding to the query object. For this purpose, the subject of the invention is a method for evaluating the class of a test datum in a data space of dimension D where $D \geq 3$, each datum belonging to at least one class containing one or more data. The method comprises a step of projecting a suite of reference data of the data space into a space of dimension Q where $Q<D$, the class of each reference datum being known. The method also comprises a step of calculating a measurement of similarity of the test datum to each of the reference data. The method also comprises a step of partitioning the projection space into a plurality of disjoint regions each containing the projection of one and only one reference datum. The method finally comprises a step of evaluating the class of the test datum, this class being evaluated as being the same class as one of the reference data contained in one of the regions containing the reference data closest to the test datum in the sense of the similarity measurement. Indeed, these regions are the regions most liable to contain a projection of the test datum.

For example, the data may be digitized data, the digitized data being able to include one or more measurements of physical characteristics of an object, whether it be a hardware object or a group of hardware objects, or whether it be an individual or a group of individuals, or whether it be a state of a system or a group of states of a system, some of whose physical characteristics may be measured.

Advantageously, the reference data may be projected into the projection space so as to minimize a function dependent on the measurement of similarity between the reference data and on the distance between the projections of said reference data, so as to preserve, in the projection space, the spatial organization of the reference data.

For example, the regions may be the Voronoi regions associated with the projections of the reference data in the projection space.

For example, the data may be digitized hand-written characters, the classes being able to group together the identical characters, each datum possibly being defined by a vector of pixels.

In one embodiment, the data may be digitized seismic curves, one class being able to group together the curves whose recording corresponds to an earthquake and another class being able to group together the curves whose recording does not correspond to an earthquake.

In another embodiment, the data may be digital photographs of melanomas, one class being able to group together the photographs of malignant melanomas and another class being able to group together the photographs of benign melanomas.

The subject of the present invention is also a method for aiding a user to decide the class of a test datum in a data space of dimension D where $D \geq 3$, each datum belonging to a class containing one or more data. The method comprises a step according to the invention for evaluating the class of the test datum, as well as a step of presenting to the user the regions containing the projections of the reference data which are closest to the test datum in the sense of the similarity measurement.

For example, the region containing the projection of the reference datum which is closest to the test datum in the sense of the similarity measurement may be presented to the user by using a predefined color to represent it.

For example, the regions containing the projections of the reference data which are closest to the test datum in the sense of the similarity measurement may be presented to the user by using predefined colors to represent them, so as to represent the regions in descending order of similarity with the test datum.

Advantageously, the method can comprise a step of assigning by the user of a class to the test datum, the class assigned by the user to the test datum possibly being or not being the class of a reference datum contained in one of the regions presented to the user.

The subject of the present invention is also a device for recognizing shapes, characterized in that it implements a method according to the invention.

The subject of the present invention is also a system for evaluating the class of a test datum in a data space of dimension D where $D \geq 3$, each datum belonging to at least one class containing one or more data. The system comprises a module for projecting a suite of reference data of the data space into a space of dimension Q where $Q<D$, the class of each reference datum being known. The system also comprises a module for calculating a measurement of similarity of the test datum to each of the reference data. The system also comprises a module for partitioning the projection space into a plurality of disjoint regions each containing the projection of one and only one reference datum. The system also comprises a module for evaluating the class of the test datum, this class being evaluated as being the same class as one of the reference data contained in one of the regions containing the reference data closest to the test datum in the sense of the similarity measurement. Indeed, these regions are the regions most liable to contain a projection of the test datum.

For example, the data may be digitized data, the digitized data being able to include one or more measurements of physical characteristics of an object, whether it be a hardware object or a group of hardware objects, or whether it be an individual or a group of individuals, or whether it be a state of a system or a group of states of a system, some of whose physical characteristics may be measured.

Advantageously, the reference data may be projected into the projection space so as to minimize a function dependent on the measurement of similarity between the reference data and on the distance between the projections of said reference data, so as to preserve, in the projection space, the spatial organization of the reference data.

For example, the regions may be the Voronoi regions associated with the projections of the reference data in the projection space.

For example, the data may be digitized hand-written characters, the classes being able to group together the identical characters, each datum possibly being defined by a vector of pixels.

In one embodiment, the data may be digitized seismic curves, one class being able to group together the curves whose recording corresponds to an earthquake and another class being able to group together the curves whose recording does not correspond to an earthquake.

In another embodiment, the data may be digital photographs of melanomas, one class being able to group together the photographs of malignant melanomas and another class being able to group together the photographs of benign melanomas.

The subject of the present invention is also a system for aiding a user to decide the class of a test datum in a data space of dimension D where D≥3, each datum belonging to a class containing one or more data. The system comprises a module according to the invention for evaluating the test datum class and a module for presenting to the user the regions containing the projections of the reference data which are closest to the test datum in the sense of the similarity measurement.

For example, the region containing the projection of the reference datum which is closest to the test datum in the sense of the similarity measurement may be presented to the user by using a predefined color to represent it.

For example, the regions containing the projections of the reference data which are closest to the test datum in the sense of the similarity measurement may be presented to the user by using predefined colors to represent them, so as to represent the regions in descending order of similarity with the test datum.

Advantageously, the system can comprise a module for assignment by the user of a class to the test datum, the class assigned by the user to the test datum possibly being or not being the class of a reference datum contained in one of the regions presented to the user.

The main advantages of the invention are further that it provides, with the help of a map of the reference objects, a graphical means which renders immediately intelligible to the user all the similarities between the query object and the reference objects without inducing any a priori choice. Paradoxically, another advantage of the invention is that it does not provide any decision: the user knows that he remains indispensable in his role of decision maker, this being beneficial in allowing him to maintain a feeling of responsibility when faced with decision making. Likewise, if he wanted to shirk moral or legal obligations, by using the ability that there is to defer to a decision provided by an automatic system, he does not have this possibility with the invention. This absence of automatic decision is also beneficial in that the user projects a collaborative rather than competitive behavior onto the method, liable to increase the confidence that he has therein. Finally, a system implementing the method according to the invention may be implemented on most computers furnished with a graphical display device.

Moreover, the relative positioning of the reference objects jointly with their measurement of similarity to the query object, specific positioning obtained for example by projecting the reference objects with the help of their position into a basis space $B_D$ of dimension D or with the help of their relative similarities given by a similarity matrix, advantageously makes it possible to order the degrees of resemblance of the query object to the reference objects, no longer as a function only of the measurement of the degree of similarity between the query object and the reference objects, but as a function both of this degree of similarity and of the relative similarities between reference objects themselves. More than a simple list of reference objects, ordered in descending order of their resemblance to the query object, the space of representation of the reference objects that is obtained by the method according to the invention makes it possible to determine groups of reference objects that are similar in terms of their position in the basis obtained by projection, each of these groups containing reference objects resembling to a certain degree the query object in terms of the similarity measurement. With the help of these groups, it is possible for example to assign to the query object the most significant class in the group of reference objects that are most similar to the query object, and then to assign as second class most similar to the query object the most significant class in the second group of reference objects that are most similar to the query object, and thus for the existing G groups. The space of representation of the reference objects that is obtained by the method according to the invention therefore allows this more precise estimation of the resemblance of the query object to the reference objects.

BRIEF DESCRIPTION OF THE DRAWINGS

Other characteristics and advantages of the invention will become apparent with the aid of the description which follows offered in relation to appended drawings which represent.

DETAILED DESCRIPTION

Figure 1:
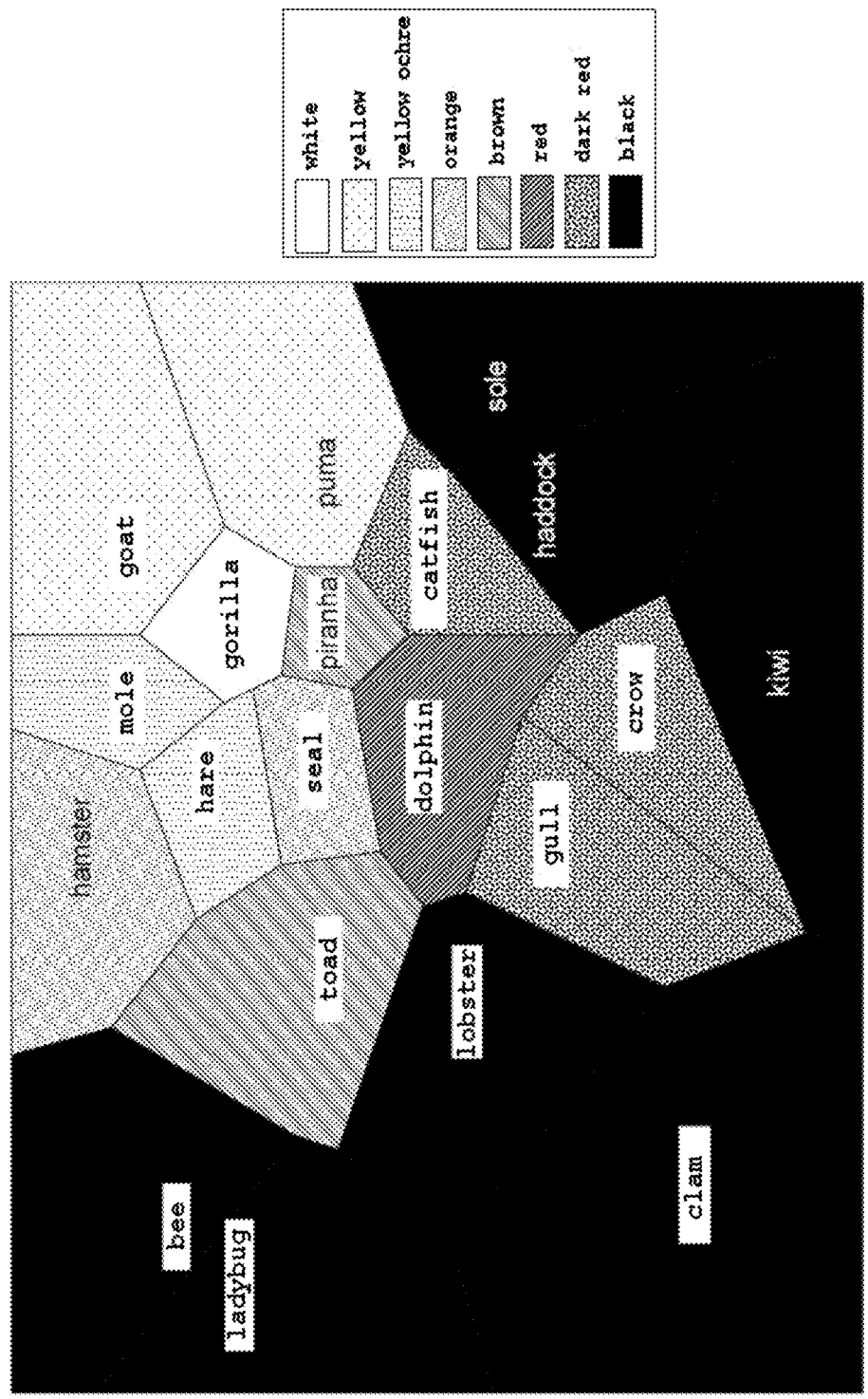
FIG. 1, through a data map, an exemplary implementation of the invention.

FIG. 1 illustrates an exemplary map of animal species according to the invention. A query object corresponding to the human species, not represented in FIG. 1, is characterized by a set of measurements of similarity to reference objects, each object corresponding to another animal species. Thus, one reference object corresponds to the species of clams, another to the species of lobsters, another to the species of ladybugs, another to the species of bees, another to the species of kiwis, another to the species of soles, another to the species of haddocks, another to the species of crows, another to the species of gulls, another to the species of catfishes, another to the species of dolphins, another to the species of toads, another to the species of hamsters, another to the species of seals, another to the species of piranha, another to the species of hares, another to the species of moles, another to the species of goats, another to the species of pumas and another to the species of gorillas. Advantageously, the region around each reference object may be colored as a function of the proximity of man to the corresponding species, this according to a given metric. By virtue of the invention, it is possible to observe the proximity of man to the mammals, to gorillas in particular.

Accordingly, the invention rests notably upon the principles which follow. A set S contains N reference objects, which are described by a set of N×K measurements of similarity $M=\{_zm_{iq}\}_{z=1\ldots K, i=1\ldots N}$ between each object i of S and a query object q which does not belong to S. The similarities $_zm_{iq}$ are real numbers whose value is a function taking at least as argument the object i considered and the object q. Optionally, $_zm_{iq}$ may be obtained with the help of a measurement of distance defined between the objects i and q represented in the form of vectors of D characteristics $v_i$ and $v_q$ defined in a basis $B_D$ of $IR^D$. Some similarity values $_zm_{iq}$ may perhaps be missing, the absence of a value is then coded in a specific manner. The membership class of the objects may optionally be provided, it may take the form of a value taken from among C possible values, each identifying a membership class.

To define the appearance of each object i of S with respect to the query object q, a set of K parameters $p_{i1}$ to $p_{iK}$ is also considered, i.e. N vectors $p_i$ defined in a basis $B_p$ of $IR^K$, together with K functions of $_zm_{iq}$, $f_{i1}$ to $f_{iK}$ defined on IR and having their value in IR, a set of functions that we call F, such that for all z of 1 ... K, $p_{iz}=f_{iz}(_zm_{iq})$. The function $f_{iz}$ may depend on other parameters, but in all cases as a minimum it depends on $_zm_{iq}$.

The reference objects are positioned on a map, that is to say a Q-dimensional metric space defined by a basis $B_Q$, thus the position of the reference object i is defined by a vector $w_i$ with Q components in $B_Q$. This positioning may be natural, the reference objects possibly already possessing coordinates allowing a representation on the map. Otherwise, this positioning may be manual, performed by the user of the invention. Or else this positioning may be automatic: measurements of similarity between reference objects, or else their position in the basis $B_D$, are then used to define the position in the basis $B_Q$ of the reference objects. For example, the reference objects may be positioned on the map so as to minimize a function of the measurements of similarity between the reference objects and of the distances between their projections on the map so as to preserve on the map the spatial organization of the reference objects in the basis $B_D$, this function possibly being for example the weighted sum of the absolute values of the pairwise discrepancies raised to a power x between the measurement of similarity between the reference objects and the Euclidian distance between their projections on the map, the weighting being a function of the measurements of similarity between the reference objects and of the distances between their projections on the map, for example so as to favor the preservation of small rather than large distances, and the power x being a real number.

Next, each reference object i is represented by a region $R_i$ described hereinbelow and for which $w_i$ determines the position. For each reference object i positioned on the map, a region $R_i$ whose appearance is parametrized by the K real numbers $p_i=(p_{i1}, \ldots, p_{iK})$ is defined. Specific appearances are associated with the various possible combinations of absence of value for these parameters. In an exemplary embodiment described subsequently, for each object i, the Voronoi region of the point with coordinates $w_i$ may be colored in gray, the luminous intensity of this gray being proportional to the value of a parameter $p_{i1}$. In another exemplary embodiment, the Voronoi region of the point $w_i$ may be colored with the help of the Red, Green, Blue color scale, the color being defined by the value of three parameters $p_{i1}$, $p_{i2}$ and $p_{i3}$ in this scale. The parameters $p_i$ may also serve to modify the shape or the size for example of the regions $R_i$.

Stated otherwise, there exists a possible step of calculating the appearance characteristics of the regions Ri (size, shape, color, texture, orientation, brightness) based on the set of available information, namely the set S of reference objects in the form of their coordinates in the basis $B_D$ or in the form of their coordinates in the basis $B_Q$, the set of measurements M of similarity of the query object to the reference objects, and the set of functions F.

Advantageously, the query object may be visualized by the appearance of the regions $R_i$. This appearance may be determined by the calculation of the parameters $p_{iz}$ which are functions of $_zm_{iq}$ and optionally of an arbitrary set of additional parameters. If $_zm_{iq}$ has no value (missing value), the parameter $p_{iz}$ does not provide any value and a specific appearance is then used.

For example, $p_{iz}$ may be defined as follows:

$$p_{iz}=(_zm_{iq}-m_m)/(m_M-m_m) \text{ where } m_M \text{ and } m_m \text{ are two scale parameters.}$$

For example, it is possible to use $m_m=\min_k(_zm_{kq})$ and $m_M=\max_k(_zm_{iq})$.

Figure 1A:
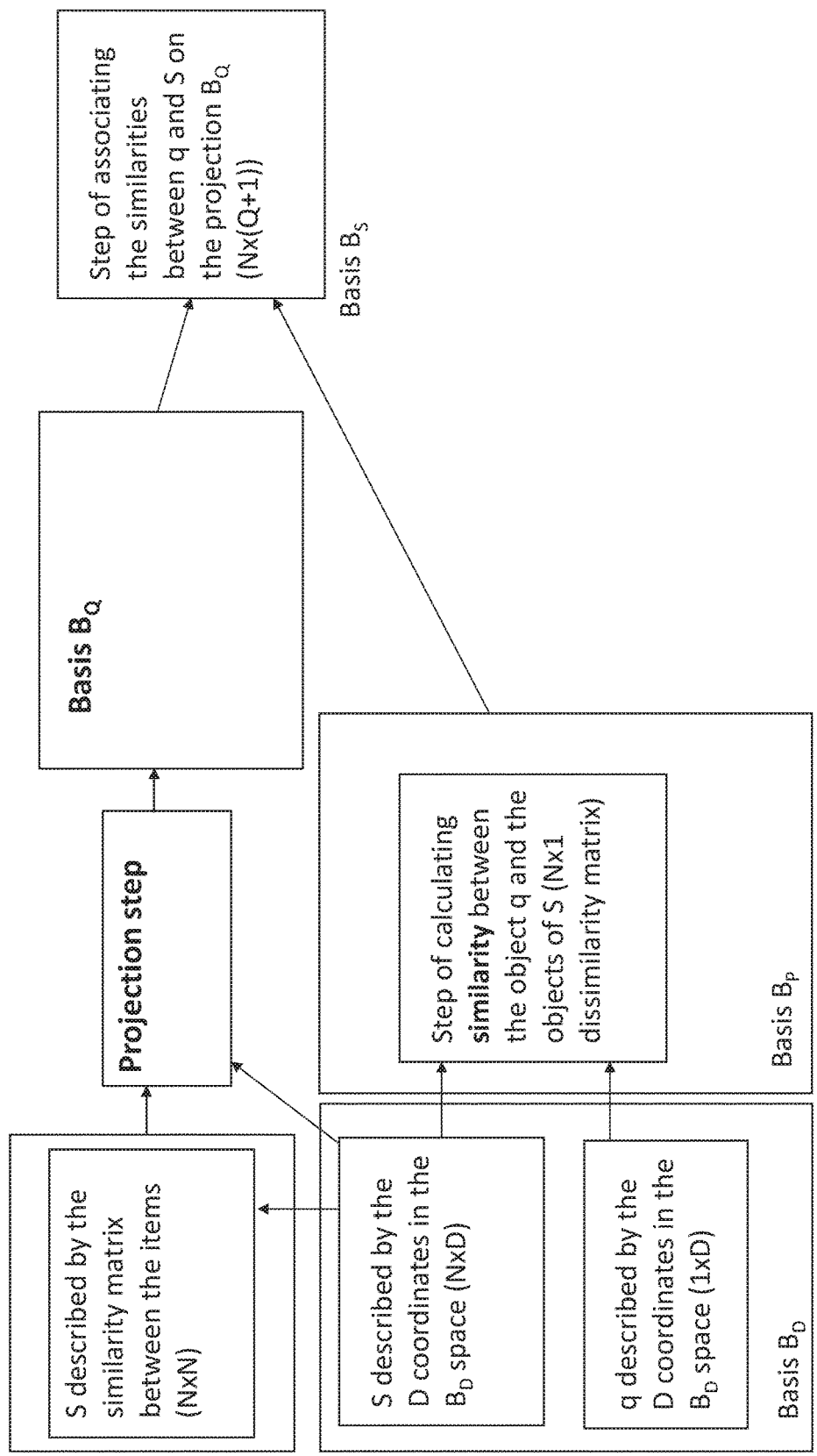
FIG. 1A, through a chart, projection steps according to the invention.

Stated otherwise, as illustrated by FIG. 1A, the reference objects S and the query object q not belonging to S, may be described in the same basis $B_D$, with the help of which, on the one hand the measurements M of similarity of each object i of S to the query object q defining the coordinates of q in the basis $B_P$ are calculated in the form of a function (for example the Euclidian distance) taking as argument the characteristics in $B_D$ of the query object q and of the objects of S, and on the other hand the characteristics of the objects of S in the basis $B_Q$ are obtained by a method for projecting these objects of S described in the basis $B_D$. The Cartesian product of the basis $B_Q$ and the basis $B_P$ forms a basis $B_S$ in which each reference object S is described by its coordinates in the basis $B_Q$ and by those in its basis $B_P$, stated otherwise each object of S is described in the basis $B_S$ by a set of characteristics obtained by projection of its characteristics in $B_D$, and a set of characteristics obtained by functions F for calculating its degree of similarity to the query object q. The query object q does not exist as set of characteristics in the basis $B_S$, it appears only implicitly in its degree of similarity to the reference objects. Stated otherwise, the coordinates of each reference object in the basis $B_S$ simultaneously carry its degree of similarity to the query object q in the part $B_P$ of $B_S$ and its degree of similarity to the other reference objects through its absolute position in the part $B_Q$ of $B_S$ which implicitly gives its position relative to the other reference objects in this basis. Advantageously, a step of evaluating the degree of resemblance of the query object to the reference objects can take place through a function taking as argument the characteristics of solely the reference objects in the basis $B_S$ without any necessity to project the query object q into the basis $B_Q$ of $B_S$.

Advantageously, the basis $B_S$ can take a graphical form, the part $B_Q$ of $B_S$ giving for each reference object i its position on the screen, the part $B_P$ of $B_S$ giving the degree of resemblance of the query object q to this reference object i in the form of a color or of a specific appearance of a region $R_i$ positioned at this same spot on the screen. Stated otherwise, the method according to the invention may be viewed as a method for transforming the reference objects S and the query object q that are described in the basis $B_D$ to a classifying description of the reference objects in the basis $B_S$. Stated otherwise, the degree of resemblance of the query object q to the reference objects S consubstantial with their thus advantageously more precise classification, in the sense described previously, is expressed as such by the coordinates of the reference objects in the basis $B_S$ resulting from the application of the method. The result of the classification by the method which is the subject of the invention is given as such by the value of the coordinates of the reference objects and indirectly of the query object in the basis $B_S$.

FIG. 1A illustrates the steps of projecting from $B_D$ to $B_Q$ and from $B_D$ to $B_P$ and then the construction of $B_S$ by the Cartesian product of $B_P$ and of $B_Q$, as well as the step of classifying the query object q in this basis $B_S$.

Figure 2:
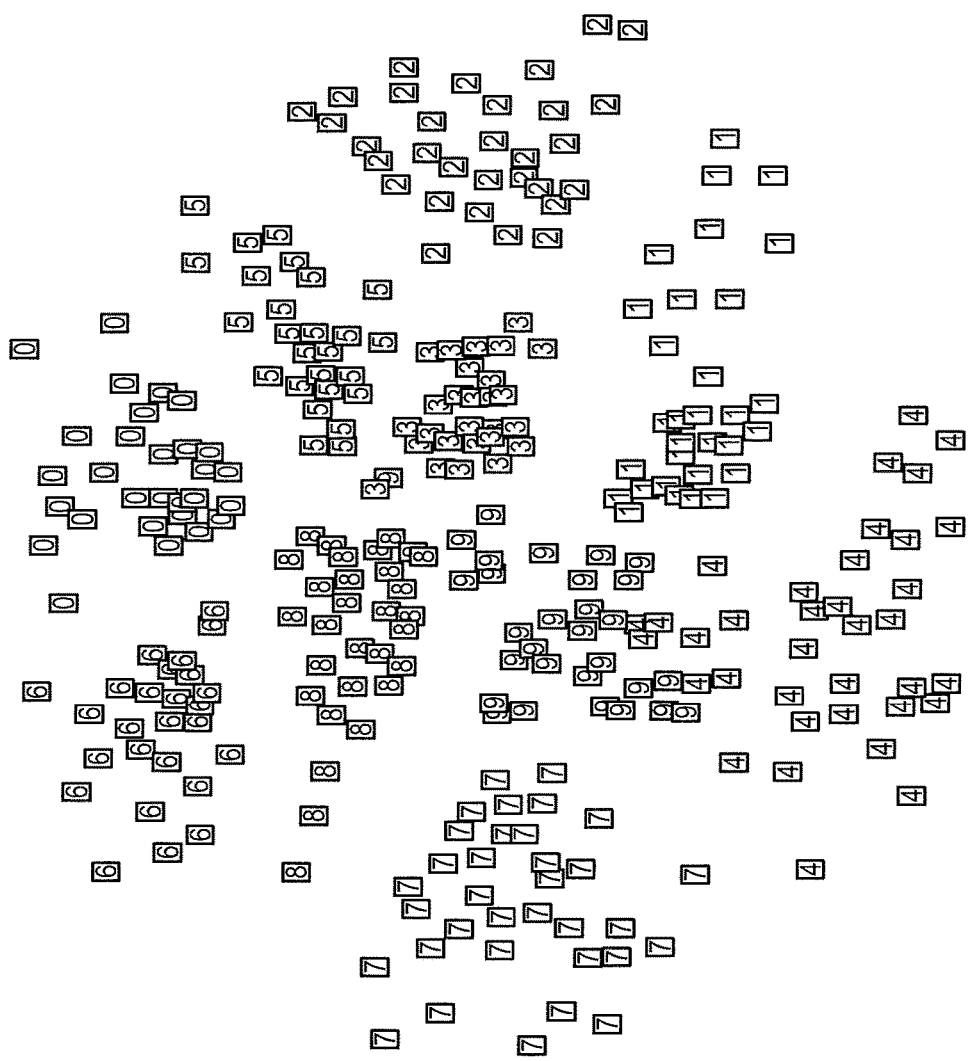
FIG. 2, another exemplary data map usable to implement the invention.

FIG. 2 illustrates an exemplary data map that may be used to implement the invention in a decision aid system, for example a system for recognizing hand-written characters. Thus, the objects may be imagettes of hand-written digits of 8×8 pixels as gray levels. The imagettes are separated into 10 balanced classes corresponding to the ten digits (0, 1, 2, ..., 9). The objective is to retrieve the class of a query imagette, that is to say to determine the digit from 0 to 9 which is represented by a matrix of 8 by 8 pixels, this digit not being known a priori. In the present example, 300 reference imagettes have been chosen arbitrarily in a public base. With the aid of a method for which the applicant has filed another patent application, the 300 imagettes have been positioned in a plane to form a map, so that the imagettes are grouped together on the map in zones. Each zone may be easily delimited visually with the help of the membership class of the imagettes that it contains, that is to say of the hand-written digit represented by the imagettes that it contains, this digit being known a priori.

Figure 3:
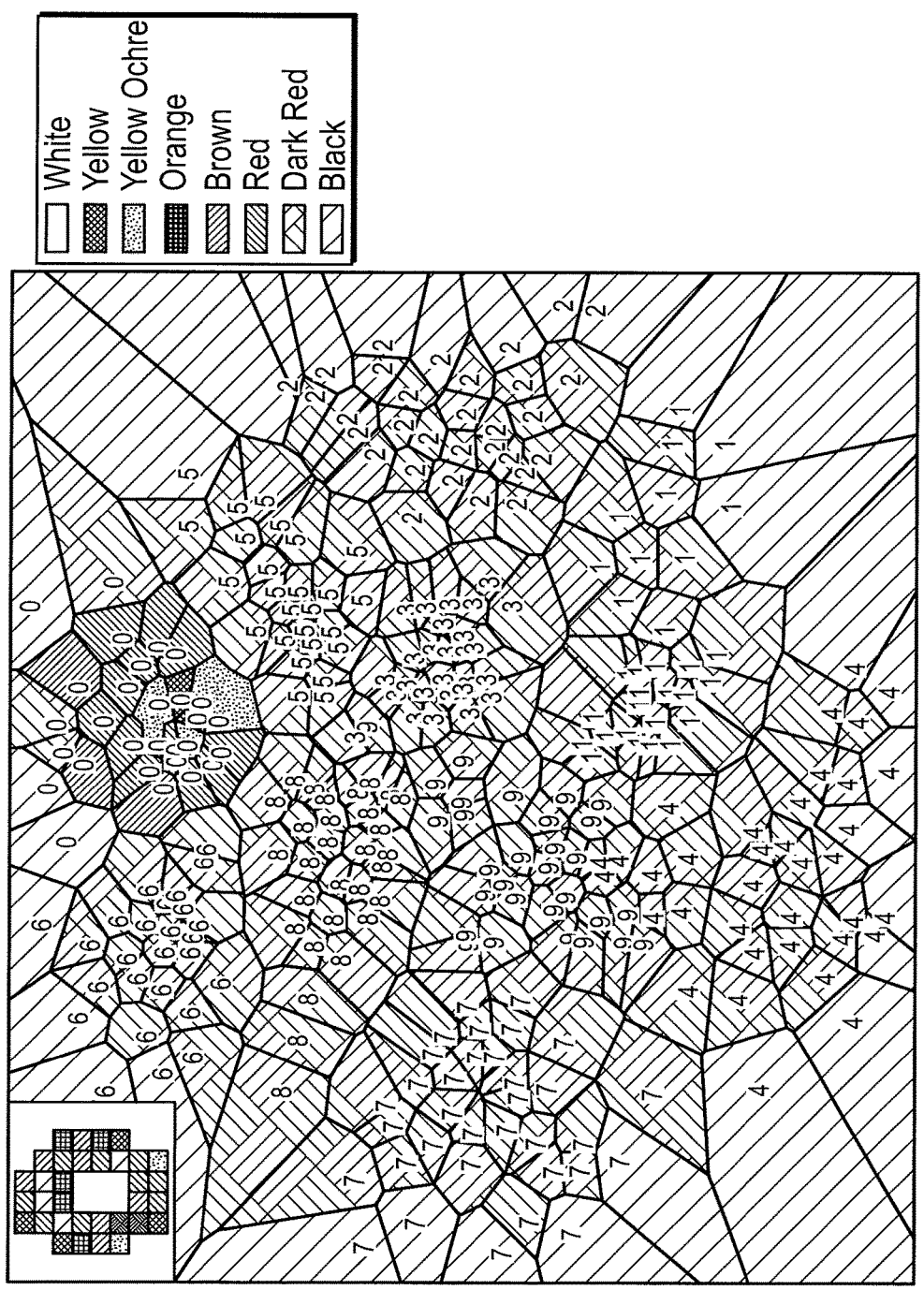
FIGS. 3, 4 and 5, through one and the same data map, examples of implementation of the invention.
Figure 4:
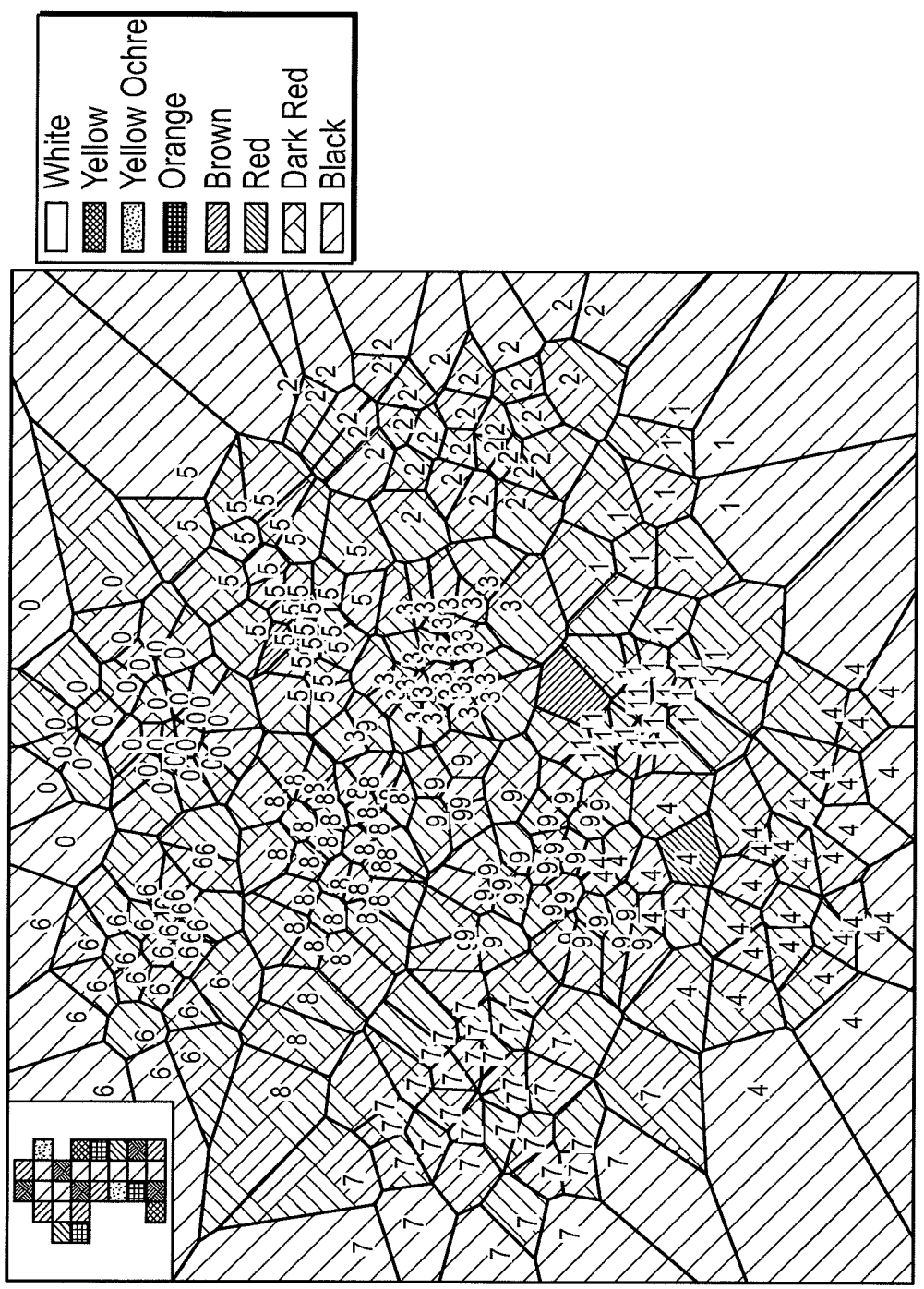
Figure 5:
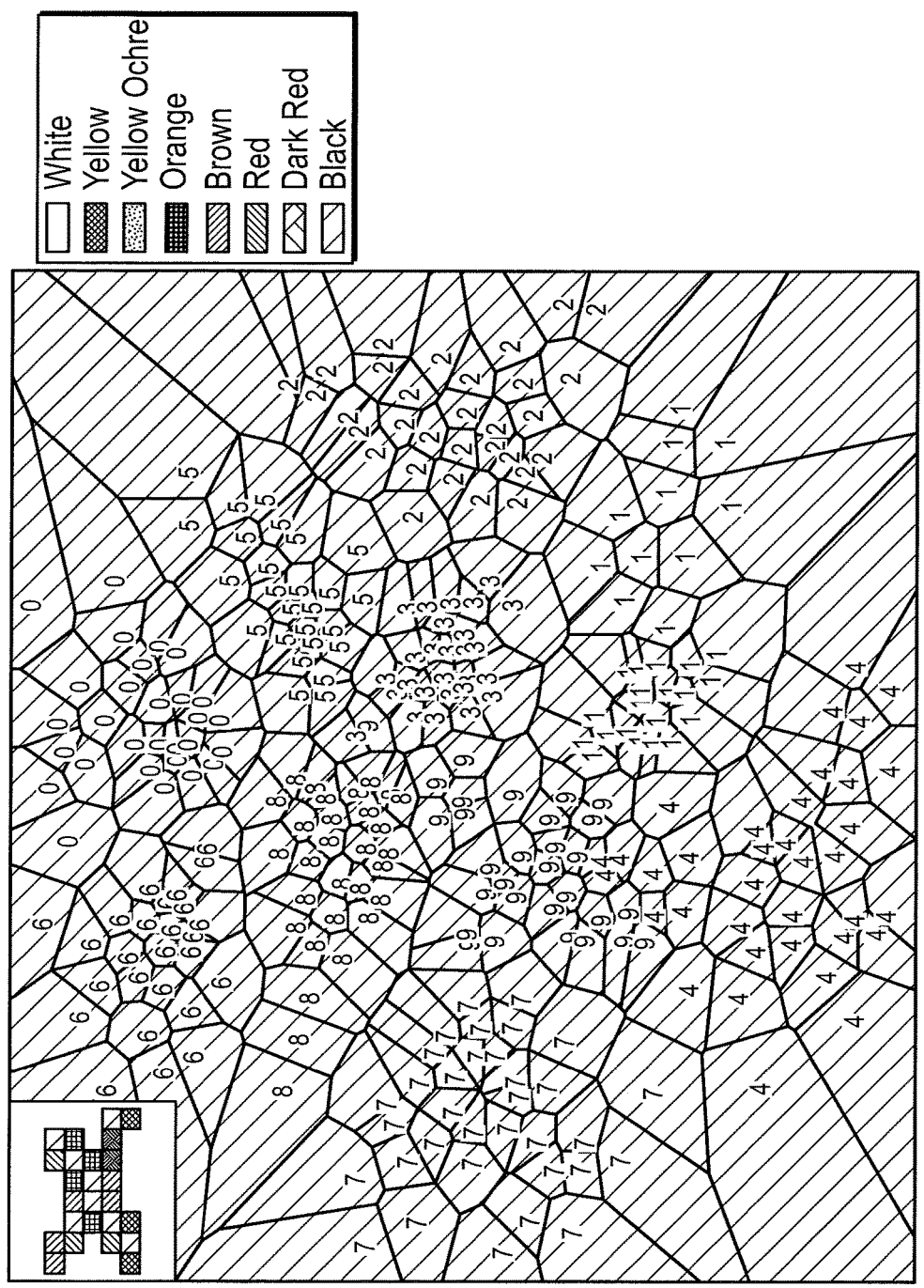

FIGS. 3, 4 and 5 illustrate the same data map as the map of FIG. 2, the map being used to evaluate according to the invention the digits represented by three examples of query imagettes. The three query imagettes correspond to the imagettes situated at the top left of FIGS. 3, 4 and 5, they being the digit 0, the digit 1 and the letter x respectively. It must be clearly understood that, in accordance with the invention, these three query imagettes are not positioned on the map illustrated by FIGS. 3, 4 and 5.

In the present example, each imagette, whether it be one of the three query imagettes or one of the 300 reference imagettes, may be defined by a vector with 64 values in [0,1], each value in [0,1] representing the luminous intensity of a pixel. In the present example illustrated by FIGS. 3, 4 and 5, the regions allowing visualization may be the Voronoi regions associated with each of the reference imagettes. The Voronoi region associated with a reference imagette contains the set of points of the plane which are closer to the point representing this imagette on the map than any other point representing an imagette. Next, on presentation of a query imagette, the Voronoi regions are colored so as to visualize the similarity between the query object considered and each reference object. This similarity is determined with the help of the similarity measurements M, which may be, in the present example, the Euclidian distance in the 64-dimensional vector space of the pixels. For example, the color may be all the brighter the closer the reference imagette is to the query imagette in the sense of the Euclidian distance. Thus, a zero Euclidian distance m (identical imagette) may be represented by a white region, whereas a high Euclidian distance m may be represented by a black region. To fix the minimum Euclidian distance corresponding to a black region, it is for example possible to calculate for each reference imagette the Euclidian distance to its $6^{th}$ nearest neighbor, the minimum distance possibly being the maximum of the six distances calculated. Thus, a Euclidian distance m that is larger than this minimum distance may be represented by the color black, shorter Euclidian distances possibly being colored according to a color level ranging from dark red (m large) to orangey yellow, and then to white (m zero).

Thus, when the query imagette represents the handwritten digit 0, as illustrated by the inset at the top left of FIG. 3, a group of neighboring regions appear without ambiguity very highlighted, notably in yellow and in orange. These are the regions associated with the reference imagettes belonging to class 0. This indicates to the user that the query imagette probably belongs to this class, this actually being the case. The invention is therefore effective in the field of shape recognition. In a generic application, this involves an object exhibiting all the typical characteristics of a reference object. The decision is then easy and the risk of error is low. Within the framework of a decision aid system, a warning signal "Nothing to signal" could be emitted for the benefit of the user.

On the other hand, when the query imagette represents the hand-written digit 1 illustrated by the inset at the top left of FIG. 4, only a few scattered regions appear slightly highlighted, notably in red. These are regions associated with 1s, with 2s, with 4s, with 5s and with 9s. These regions occupy very different zones of the plane, corresponding to varied classes and none is very greatly highlighted. The decision is therefore difficult and caution is necessary. Note, however, that it is also difficult for a reader to guess the digit with certainty on the basis of the query imagette. In a generic application, this entails a new object which is unusual but which remains identifiable to a few of the reference classes. In this case, a thorough analysis is necessary. Within the framework of a decision aid system, a warning signal "Attention" could be emitted for the benefit of the user.

Finally, when the query imagette represents the letter x, as illustrated by the inset at the top left of FIG. 5, that is to say a character which does not correspond to any reference imagette. In this case, no region is highlighted, which may be interpreted as an indicator of an anomaly of the datum presented. Thus, the proposed invention allows the user to detect this anomaly easily. In a generic application, this entails a new object which is atypical and not identifiable to the reference classes. In this case, a thorough analysis is necessary, the creation of a new class has to be envisaged. Within the framework of a decision aid system, a warning signal "Stop" could be emitted for the benefit of the user.

Thus, according to the invention, the query imagette is never positioned on the map, thereby avoiding any visual contradiction between the artificial neighborhood that would be induced by this positioning and the real neighborhood provided by the similarity measurements. The invention visualizes only the real neighborhood provided by the similarity measurements, so as to optimize the intelligibility of the item of information visualized.

It should be noted that there may not exist any measurement of similarity between the query object and a reference object (missing value), but that also one or more of them may exist. Within the meaning of the present invention, a similarity measurement is a function taking as argument two objects and parameters which are independent of these objects, such as for example a distance between two objects or an uncertainty in the distance between two objects, or else a scale parameter serving to determine the dynamic range of the values of the similarity measurement, such as its minimum and its maximum. Each reference object may be characterized by its position on the map and optionally by one or more measurements of similarity to all the other reference objects. At least one of the reference objects may be positioned manually or automatically on the map, optionally with the help of the set of similarity measurements, so as to allow visual assessment. In order to facilitate visual interpretation, a positioning is advocated such that firstly, the more similar are the reference objects according to an additional measurement provided, the closer they are on the map, and secondly, objects of like class are close and those of different classes are far apart on the map. But the query object itself is never positioned on the map.

None, one or more of the measurements of similarity between the query object and a reference object may be visualized on the map by a specific appearance, for example in terms of size, shape, texture, color, or else in the form of a region associated with this reference object. This may make it possible to visualize the absence of measurement, or to visualize a similarity endowed with its inaccuracy or with its uncertainty.

The reference objects may possess no, one or more ordinal or numerical characteristics, be they continuous or discrete (temperature of a furnace, azimuth of a radar echo, number of wheels of a vehicle). Likewise, the reference objects may possess no, one or more nominal characteristics, such as name, kind or membership class. These additional characteristics may be visualized on the map by a specific appearance, for example in terms of size, shape, texture, color, or else in the form of a region associated with this reference object.

The invention allows the user to visually and globally assess the proximity of the query object to the reference objects in terms of similarity. Thus, it aids him to make a decision as regards the nature of this object and the processing which may be suited thereto. The association of a visualization of cartographic type, for which the position of the reference objects is stable, of a measurement of similarity to be visualized on the map, as well as the absence of positioning of the query object on the map render the invention more especially utilizable in the field of decision aid in discrimination and in the field of the detection of an anomaly of a query object in relation to reference objects.

The main advantage of the invention is further of presenting a map of the reference objects such that the position of these objects or of the zones serving to represent them is fixed and independent of the query object. This map therefore constitutes a stable basis allowing visual assessment of the universe of the reference objects, as well as easy memorization of this representation. This stability allows the user to focus his attention on the resemblances between the query object and the reference objects rather than between the reference objects themselves, since he is not disturbed by changes of position of the reference objects.

Moreover, in the absence of positioning of the query object among the reference objects, there are no contradictory stimuli between the query object and the reference objects.

Moreover, the representation of the resemblance between the query object and the reference objects by a visual parameter of these reference objects, other than their position, offers an immediate visual perception of the reference objects that are most similar or most different from the query object.

Finally, a system implementing the method according to the invention described previously may be implemented on most computers furnished with a graphical display device.

The main advantage of the invention described previously is further that no decision is taken: there is no confidence indicator, nor any combination of logical rules, nor probability of global membership in classes, all information whose provenance and interpretation are not under the user's control. It is the measurements of similarity between the query object and each reference object which are visualized. Above all, it is indeed a measurement of similarity between the query object and each reference object which is visualized, and not only a characteristic of the reference objects that is independent of the query object. This point is particularly advantageous when the objects possess more than one characteristic, making it difficult to visualize these multiple characteristics on one and the same map for each object and likewise complicating visual comparison with the characteristics of the query object.

Moreover, the invention makes it possible to visualize without deformation the raw similarity measurements provided as input. According to the application, the measurement will be known to the user or at least will be intelligible to him: there is no bias due to another processing not under the control of the user. This renders the visualized item of information intelligible and is beneficial in affording the user confidence in this item of information. The invention also applies to objects which do not necessarily have any natural representation in map form, since the representation of the resemblance between the query object and the reference objects does not depend on this positioning. The invention can therefore not only be applied to objects positioned on the map by an arbitrary automatic or manual means, but it can also be applied to objects whose graphical representation in map form is predefined, such as the boundaries of geographical zones for example, where each zone corresponds to a reference object. The visualized measurement is a measurement of similarity between the query object and the reference objects, thereby making it possible to mentally position the former with respect to the latter, whereas the maps according to the prior art represent an item of information that is specific to the reference objects represented, independently of the query object.

The fields of application of the invention are vast, the method according to the invention being generic and able therefore to be applied to any field involving a decision aid system in discrimination, notably shape recognition systems.

For example, the invention is applicable in the field of aid to medical diagnosis, such as the diagnosis of melanomas. Indeed, the diagnosis of melanomas is very difficult for general practitioners. Decision aid tools can assist general practitioners in their choice as to whether or not to send patients for consultation with a dermatologist. Thus, the "query" melanoma colors the reference melanomas and allows the doctor to determine its seriousness. It is possible to generalize to other pathologies for which the invention would make it possible to aid the doctor in steering the patient through a course of care.

For example, the invention is applicable in the field of research into the origin of seismic events, such as the determination of their natural or anthropic origin (e.g. quarry blasts). This is routine work done by geophysicist analysts with the help of signals picked up on multiple measurement stations. The analyst views a map of the events customarily encountered, grouped together spatially as a function of their origin. The event undergoing analysis colors on the map the similar reference events, thus aiding the analyst to determine its origin.

For example, the invention is applicable in the field of marketing, such as the analysis of the behavior of customers. Reference customers may be visualized and grouped together by category on a map, each category corresponding to a particular target to which specific advertising messages are sent. A new customer is visualized according to his proximity to the reference customers, thereby making it possible to recognize the category or categories to which he is closest.

For example, the invention is applicable in the field of risk evaluation in regard to credit, the stock market or insurance. This entails evaluating the risks of drifting of a client's financial situation so as to define the type of credit or the risk rating to apply to him.

For example, the invention is applicable in the field of biometry. An individual may be identified by a photograph of his face or a fingerprint. These elements may be compared with reference elements positioned on a map. The investigating analyst sees rapidly whether the individual is similar to one or more reference individuals or conversely completely new.

For example, the invention is applicable in the field of industrial or computer security. In a nuclear power facility, the operator in charge of monitoring the operation of the facility views a map of the various reference states customarily measured during normal operation. The current operating state is displayed in the form of a coloration of the reference states which is related to their similarity to this current state. If the current state appears to move further and further away from the reference states, the operator sees this and triggers the appropriate procedures for shutdown, evacuation or simple checks. Likewise, it is possible to detect an intruder into a computer system, whose modes of behavior do not resemble referenced normal modes of behavior.

For example, the invention is applicable in the field of transport, of logistics or else of predictive maintenance. It then entails tracking the state of the flows and visually detecting drifts with respect to a reference situation.

For example, the invention is applicable in the field of the classifying of digital documents, such as Internet favorites, Web pages or else personal folders. An internaut who views a new Internet site and who wishes to add it to his list of preferred sites is then presented with a view of the sites already present in this list in the form of a map. The new site then colors the preferred sites as a function of their similarity therewith, thereby allowing the internaut to decide the most appropriate category or categories to classify it, or the creation of a new category. It is possible to tailor this principle for any type of document, whether photos, video or text.

For example, the invention is applicable in the field of consumer aid in the choice of a complex product defined by multiple characteristics, such as a television, a washing machine, a portable telephone, a computer, a car, a house, insurance, an investment product, a mobile telephone subscription. In the latter case, which is typical, the package deals (references) are represented on a map, and the customer is asked to define his type of consumption (therefore his ideal package). The invention then makes it possible to present the customer with the packages closest to his ideal package, the map-like organization making it possible to clearly distinguish the packages that are close to the customer's ideal with respect to the others. The invention then also makes it possible to distinguish the various families of packages which would differ drastically according to characteristics that the customer had not specified (price, Internet option, etc.). This allows the customer to focus on each of these families of deals very rapidly and to visualize "where" he is in the jungle of information by virtue of the map.

The previous example of imagettes is given merely by way of illustration. Indeed, the present invention is also applicable to all sorts of data, notably digitized data. These digitized data can include measurements of physical characteristics taken on very varied objects other than photos, whether they be hardware objects, individuals, states of a system, or else a group of such objects, individuals or states, some of the physical characteristics of which are measured.

Naturally, these digitized data can include scalars, that is to say real numbers, such as measurements provided by a sensor.

But these digitized data can also include symbols (element of an alphabet) such as an element value of a finite set (letter of a word, name of an object, etc.).

These digitized data can also include vectors, such as a sensor measurement together with its uncertainty or a set of measurements arising from a network of sensors or a signal (sequence of measurements, flows, etc.) or a set of values arising from a database or a word, a sentence, a text or a set of normalized measurements (proportions) or else any set of scalar or symbolic data.

These digitized data can also include matrices, such as a plane black and white image or a set of signals arising from a network of sensors or genetic data or else any set of vector-like data.

These digitized data can also include multi-dimensional arrays, such as a sequence of images (video) or a multi-spectral image (satellite image) or a color image (photograph, result of simulations) or a 3D image (scanner) or a multi-dimensional mesh (simulation model) or else any set of matrix-like data or of multi-dimensional arrays of lower dimension.

These digitized data can also include graphs and networks, such as a social network or the Internet network or a transport network (road traffic, information, energy, etc.) or a network of interactions (proteins, genes) or a network of sensors or a numerical modeling mesh (modeling in 2D, 3D, 3D with time, etc).

These digitized data can also include cellular complexes or hypergraphs, such as a numerical modeling mesh (virtual objects, multi-physical modeling, animation films) or biological or molecular or physical or climatic or mechanical or else chemical models.

These digitized data can also include complex data such as multimedia documents (organized set of texts, videos, audio signals, etc.) or a collection of documents or else any set of organized documents (library).

These digitized data can also include contracts of subscription to a service, such as telephone subscription contracts for example. The method and the system according to the present invention could then advantageously make it possible to choose the most suitable telephone package, as a function of the user's profile.

The invention claimed is:

1. A computer-implemented method of evaluating a class of a test datum, the method being implemented in a computing system, said test datum being defined in a data space of dimension D where D≥3, said data space further comprising reference data, the class of each reference datum being known, the method comprising:
projecting with an object evaluation computer a set of reference data of the data space into a space of dimension Q where Q<D;
calculating with the object evaluation computer a similarity matrix comprising measures of similarities of the test datum with respect to each of the reference data of said set of reference data;
defining with the object evaluation computer a region in the projection space for each reference datum, said region being associated with a set of appearance parameters, the appearance parameters associated with the region depending on the measure of similarity between the test datum and the reference datum;
evaluating with the object evaluation computer the class of the test datum from the classes of the reference data comprised in one of said regions depending on the appearance parameters associated with said regions; and
generating a representation of the regions containing the projections of the reference data with the object evaluation computer on a user interface included in said computing system based on at least some of the appearance parameters,
wherein the representation of the regions containing the projections of the reference data with the object evaluation computer on the user interface renders similarities between the test datum and the reference datum to the user, which are visualized on a map.

2. The method as claimed in claim 1, wherein the data are digitized data.

3. The method as claimed in claim 2, wherein the digitized data include one or more measures of physical characteristics of an object.

4. The method as claimed in claim 3, wherein the object is:
a hardware object or a group of hardware objects, or;
an individual or a group of individuals, or;
a state of a system or a group of states of a system.

5. The method as claimed in claim 1, wherein said step of projecting the reference data into the projection space comprises projecting said reference data so as to minimize a function dependent on:
the measures of similarity between the reference data;
the distance between the projections of said reference data;
said function minimization taking into account the spatial organization of the reference data.

6. The method as claimed in claim 5, wherein said regions are Voronoi regions associated with the projections of the reference data in the projection space.

7. The method as claimed in claim 6, wherein the data are digitized hand-written characters, the classes grouping together the identical characters, each datum being defined by a vector of pixels.

8. The method as claimed in claim 1, wherein the data are digitized seismic curves, one class grouping together the curves whose recording corresponds to an earthquake and another class grouping together the curves whose recording does not correspond to an earthquake.

9. The method as claimed in claim 1, wherein the data are digital photographs of melanomas, one class grouping together the photographs of malignant melanomas and another class grouping together the photographs of benign melanomas.

10. The method as claimed in claim 1, wherein said representation is based on colors determined from at least some of the appearance parameters.

11. The method as claimed in claim 1, wherein said representation is based on a given color, the light intensity of said color being determined from at least some of the appearance parameters.

12. The method as claimed in claim 1, wherein said representation is generated from displaying features determined from a function of at least some of the appearance parameters.

13. The method as claimed in claim 1, wherein said step of projecting the reference data into the projection space comprises projecting said reference data so as to minimize a function, said function being a weighted sum of absolute values of differences between said measure of similarity.

14. A device for recognizing shapes comprising an object evaluation computer, wherein the object evaluation computer it implements a method as claimed in claim 1.

15. A computer-implemented system for evaluating a class of a test datum, said test datum being defined in a data space of dimension D where D≥3, said data space further comprising reference data, the class of each reference datum being known, the system being configured to:
project with an object evaluation computer a set of reference data of the data space into a space of dimension Q where Q<D;
calculate with the object evaluation computer a similarity matrix comprising measures of similarities of the test datum with respect to each of the reference data of said set of reference data;
define with the object evaluation computer a region in the projection space for each reference datum, said region being associated with a set of appearance parameters, the appearance parameters associated with the region depending on the measure of similarity between the test datum and the reference datum;
evaluate with the object evaluation computer the class of the test datum from the classes of the reference data comprised in one of said regions depending on the appearance parameters associated with said regions; and
generate a representation of the regions containing the projections of the reference data on a user interface with the object evaluation computer based on at least some of the appearance parameters, wherein the representation of the regions containing the projections of the reference data with the object evaluation computer on the user interface renders similarities between the test datum and the reference datum to the user, which are visualized on a map.

16. The system as claimed in claim 15, wherein the data are digitized data.

17. The system as claimed in claim 16, wherein the digitized data include one or more measurements of physical characteristics of an object.

18. The system as claimed in claim 17, wherein the object is:
a hardware object or a group of hardware objects, or;
an individual or a group of individuals, or;
a state of a system or a group of states of a system.

19. The system as claimed in claim 15, wherein the reference data are projected into the projection space so as to minimize a function dependent on:
- the similarity matrix between the reference data;
- the distance between the projections of said reference data;
- said function minimization taking into account the spatial organization of the reference data in the projection space.

20. The system as claimed in claim 19, wherein said regions are Voronoi regions associated with the projections of the reference data in the projection space.

21. The system as claimed in claim 20, wherein the data are digitized hand-written characters, the classes grouping together the identical characters, each datum being defined by a vector of pixels.

22. The system as claimed in claim 15, wherein the data are digitized seismic curves, one class grouping together the curves whose recording corresponds to an earthquake and another class grouping together the curves whose recording does not correspond to an earthquake.

23. The system as claimed in claim 15, wherein the data are digital photographs of melanomas, one class grouping together the photographs of malignant melanomas and another class grouping together the photographs of benign melanomas.

24. The system as claimed in claim 15, wherein said representation is based on colors determined from at least some of the appearance parameters.

25. The system as claimed in claim 15, wherein said representation is based on a given color, the light intensity of said color being determined from at least some of the appearance parameters.

26. The system as claimed in claim 15, wherein said representation is generated from displaying features determined from a function of at least some of the appearance parameters.

* * * * *